US009294552B2

(12) United States Patent
Jimenez et al.

(10) Patent No.: US 9,294,552 B2
(45) Date of Patent: Mar. 22, 2016

(54) CLOUD COMPUTING APPLIANCE THAT ACCESSES A PRIVATE CLOUD AND A PUBLIC CLOUD AND AN ASSOCIATED METHOD OF USE

(71) Applicant: MicroTechnologies LLC, Vienna, VA (US)

(72) Inventors: Anthony R. Jimenez, Great Falls, VA (US); Robert Kirsch, Mobile, AL (US); Roger Channing, Fairfax Station, VA (US); Alfredo Guzman, Manassas, VA (US)

(73) Assignee: MicroTechnologies LLC, Vienna, VA (US)

( * ) Notice: Subject to any disclaimer, the term of this patent is extended or adjusted under 35 U.S.C. 154(b) by 275 days.

(21) Appl. No.: 13/946,585

(22) Filed: Jul. 19, 2013

(65) Prior Publication Data

US 2013/0332515 A1    Dec. 12, 2013

Related U.S. Application Data

(63) Continuation-in-part of application No. 13/360,157, filed on Jan. 27, 2012, now Pat. No. 9,213,580.

(51) Int. Cl.
*H04L 29/08* (2006.01)
*G06F 9/445* (2006.01)
*G06F 15/16* (2006.01)
*G06F 9/50* (2006.01)

(52) U.S. Cl.
CPC ............ *H04L 67/10* (2013.01); *G06F 9/44505* (2013.01); *G06F 9/5072* (2013.01); *G06F 15/161* (2013.01)

(58) Field of Classification Search
CPC . G06F 9/44505; G06F 9/5072; G06F 15/161; H04L 67/10
See application file for complete search history.

(56) References Cited

U.S. PATENT DOCUMENTS

| 8,528,101 | B1 | 9/2013 | Miller et al. |
|---|---|---|---|
| 2003/0028577 | A1 | 2/2003 | Dorland et al. |
| 2004/0015891 | A1 | 1/2004 | Arellano-Payne et al. |
| 2005/0021548 | A1 | 1/2005 | Bohannon et al. |
| 2005/0086584 | A1 | 4/2005 | Sampathkumar et al. |
| 2005/0150953 | A1 | 7/2005 | Alleshouse |
| 2006/0095960 | A1* | 5/2006 | Arregoces et al. ............... 726/11 |
| 2011/0289329 | A1* | 11/2011 | Bose et al. ..................... 713/320 |

(Continued)

OTHER PUBLICATIONS

"Portable Server Rack", Rack Solutions, Jul. 31, 2010, p. 1-2.*

(Continued)

*Primary Examiner* — Brian J Gillis
*Assistant Examiner* — Gil H. Lee
(74) *Attorney, Agent, or Firm* — Thompson Coburn LLP

(57) ABSTRACT

The present invention is a cloud computing appliance, having a chassis, at least one server, capable of connecting to a remote interface device, at least two network switches, at least one firewall, and a power supply circuit. The present invention also includes a method for initializing the cloud computing appliance, and a method for migrating software applications to the cloud computing appliance. The cloud computing appliance includes at least one private cloud and is in electronic communication with at least one public cloud. There is an electrical connection capable of being in electronic communication with the remote interface device that allows a system administrator to interact with the at least one private cloud and the at least one public cloud.

19 Claims, 9 Drawing Sheets

(56) References Cited

U.S. PATENT DOCUMENTS

| | | | |
|---|---|---|---|
| 2012/0131173 A1* | 5/2012 | Ferris et al. | 709/224 |
| 2012/0151025 A1 | 6/2012 | Bailey et al. | |
| 2012/0185624 A1* | 7/2012 | Dang et al. | 710/104 |
| 2012/0222106 A1 | 8/2012 | Kuehl | |
| 2012/0250682 A1 | 10/2012 | Vincent et al. | |
| 2012/0287931 A1 | 11/2012 | Kidambi et al. | |
| 2013/0018994 A1 | 1/2013 | Flavel et al. | |
| 2013/0061306 A1 | 3/2013 | Sinn | |
| 2013/0067090 A1 | 3/2013 | Batrouni et al. | |
| 2013/0067550 A1 | 3/2013 | Chen et al. | |
| 2013/0085989 A1* | 4/2013 | Nayyar et al. | 707/610 |
| 2013/0086236 A1 | 4/2013 | Baucke et al. | |
| 2013/0091241 A1* | 4/2013 | Goetz et al. | 709/217 |
| 2013/0097304 A1 | 4/2013 | Asthana et al. | |
| 2013/0103844 A1 | 4/2013 | Bulut et al. | |
| 2013/0151980 A1 | 6/2013 | Lee et al. | |
| 2013/0198180 A1 | 8/2013 | Channing | |
| 2013/0198384 A1 | 8/2013 | Kirsch, II et al. | |
| 2013/0346839 A1* | 12/2013 | Dinha | 715/205 |

OTHER PUBLICATIONS

International Search Report and Written Opinion for International Patent Application No. PCT/US2013/020726 dated May 14, 2013.

Mell et al., "Draft NIST Working Definition of 'Cloud Computing'", Oct. 7, 2009.

"Portable Server Rack", Rack Solutions, Jul. 31, 2010, 2 pages.

* cited by examiner

| Example Software Components | |
|---|---|
| 601 | Graphical User Interface |
| 602 | Cloud Operating System |
| 603 | Environment Discovery Tool |
| 604 | Migration Software |

FIG. 6

CLOUD COMPUTING APPLIANCE THAT ACCESSES A PRIVATE CLOUD AND A PUBLIC CLOUD AND AN ASSOCIATED METHOD OF USE

CROSS-REFERENCE TO RELATED APPLICATION

This patent application is a continuation-in-part of U.S. patent application Ser. No. 13/360,157 filed Jan. 27, 2012, incorporated herein by reference in its entirety.

FIELD OF INVENTION

The present invention relates generally to cloud computing and in particular to system administrator assisted creation, operation, and management of a private cloud application that is electronic communication with a public cloud.

BACKGROUND OF THE INVENTION

Cloud computing is the delivery of computing as a service rather than a product, whereby resources, software, and information are provided to computers and other devices as a utility over a network. Typically, cloud computing services are offered by cloud computing service providers on a pay-per-usage basis. Cloud computing has evolved into multiple deployment models, including public clouds, community clouds, and private clouds. A "public cloud" is a model where a service provider makes resources, such as software applications and storage, available to the general public. A "private cloud" is infrastructure operated solely for a single organization or restricted group of users. A "private cloud" may be hosted by a third party or hosted internally or externally by the specific community whether managed internally or by a third-party and hosted internally or externally by the single organization or restricted group of users. A "community cloud" shares infrastructure between several organizations from a specific community with common concerns.

There are a number of challenges associated with relying solely on a public cloud computing environment or a community cloud computing environment. First, data governance is hindered by the use of a public cloud or community computing providers that may or may not guarantee the safety and security of data stored in the provider's cloud. Second, public computing providers lack resource management capabilities which allow a system administrator to scale resource utilization based on server load and software application usage. Third, network latency associated with using a public cloud or community computing environment may make the cloud sluggish and cumbersome. Fourth, system administrators may find themselves at the mercy of a public cloud or community computing provider because of poor reliability or low availability. Finally, there remains the looming issue of security on the virtual servers that make up the public environment or community environment. For these reasons, a system administrator is well-advised to seek a private cloud solution in an attempt to overcome some or all of these challenges associated with relying solely on a public cloud or community cloud computing environment. However, a private cloud does not provide all of the computing resources that may be needed or desired. There may be programs and data that do not require the highest level of security that is provided by a private cloud or community cloud. Moreover, it is important to have a backup for data and/or software applications for backup in the event of a system failure or emergency.

The creation of a cloud solution requires a knowledge set not normally available to the average system administrator. The implementation process may be a timely and frustrating process replete with opportunities for making mistakes or introduction of errors, which will terminate the process or lead to a less than optimal cloud instance. For these reasons, a straight forward method of initializing and creating a stand-alone cloud computing appliance is desirable.

Once a private cloud solution has been created, system administrators need the capability of migrating software applications to the cloud in order to make use of the available cloud resources. Traditionally, a system administrator takes inventory of local software applications and selects candidates for migration to the cloud. For these reasons, a method of migrating software applications to a stand-alone cloud computing appliance is desirable.

It may also be desirable to create a cloud computing environment in a remote or inhospitable location. Traditional cloud computing service providers would be inadequate due to lack of network connectivity and network latency. A mobile cloud computing platform could be deployed to such a location and a private cloud environment in combination with a public cloud environment could be utilized to provide cloud services to a remote or inhospitable geographic area.

The present invention is directed to overcoming one or more of the problems set forth above.

SUMMARY OF THE INVENTION

This section provides a general summary of the disclosure, and is not a comprehensive disclosure of its full scope or all of its features. The present invention is directed to a cloud computing application that accesses at least one private cloud and at least one public cloud.

In an aspect of the present invention, a cloud computing appliance is disclosed. The cloud computing appliance includes a chassis with sufficient storage capacity to hold hardware components necessary to operate a private cloud and provide electronic communication to a public cloud, at least one server mounted on the chassis and capable of hosting a private cloud operating system, a plurality of software applications and data storage, wherein the at least one server includes a system management server that utilizes system management software for managing the cloud computing appliance, the private cloud, the public cloud, and the software applications, an electrical connection capable of being in electronic communication with a remote interface device that allows a system administrator to interact with the private cloud and the public cloud, wherein the remote interface device provides guidance to the system administrator to create and administer the private cloud and is connected to the at least one server as well as being in electronic communication with the public cloud, at least two network switches mounted on the chassis and in electronic communication between the at least one server and at least one of the private cloud and the public cloud, at least one firewall mounted on the chassis in electronic communication with the at least two network switches, and at least one power supply circuit capable of distributing power to the at least one server, the at least two network switches and the at least one firewall.

In another aspect of the present invention, a cloud computing appliance is disclosed. The cloud computing appliance includes at least one chassis with sufficient storage capacity to hold hardware components necessary to operate at least one private cloud and provide electronic communication to at least one public cloud, a plurality of servers mounted on the rack and capable of hosting a private cloud operating system, software applications and data storage, wherein the plurality of servers includes a system management server that utilizes system management software for managing the cloud computing appliance, the at least one private cloud and the at least one public cloud, and the software applications, an electrical connection capable of being in electronic communication with a remote interface device that allows a system administrator to interact with the at least one private cloud and the at least one public cloud, wherein the remote interface device provides guidance to the system administrator to create and administer the at least one private cloud that is connected to the plurality of servers as well as being in electronic communication with the at least one public cloud, at least one firewall mounted on the chassis in electronic communication with the private cloud and the public cloud, at least two network switches mounted on the chassis and in electronic communication between the plurality of servers and the at least one firewall, and at least one power supply circuit capable of distributing power to the plurality of servers, the at least two network switches, and the at least one firewall, wherein the cloud computing appliance is a self-contained, stand-alone unit.

In yet another aspect of the present invention, a method of initializing a cloud computing appliance is disclosed. The method includes applying power to a power supply circuit of a cloud computing appliance, which also includes a chassis, an electrical connection that is capable of being in electronic communication with a remote interface device and at least one private cloud and at least one public cloud, a plurality of servers, at least one cloud computing operating system, at least two network switches, and a firewall, activating a graphical user interface (GUI) on the remote interface device, utilizing the remote interface device to provide queries to a system administrator to allow initialization of a private cloud computing operating system associated with the at least one private cloud, starting the private cloud computing operating system, utilizing the remote interface device to request required keys from a system administrator, initiating a private cloud operating system virtualizer, utilizing the remote interface device to allow a system administrator to enter an internet protocol (IP) range of addresses, each of the internet protocol (IP) addresses representing one of the plurality of servers, to be integrated into the private cloud, locating and initializing, if not already initialized, each system administrator-selected server with the selected private cloud computing operating system, incorporating the physical resources of each server of the plurality of servers into the private cloud, utilizing the remote interface device to provide queries to the system administrator so that virtual server information is entered, creating virtual servers for the at least one private cloud, and selectively accessing the at least one public cloud for accessing at least one software application and a database.

In yet another aspect of the present invention, a method of migrating software applications to a cloud computing appliance is disclosed. The method includes utilizing a remote interface device to allow a system administrator to invoke a software application migration system for the cloud computing appliance that is in electronic communication to at least one public cloud and at least one private cloud, searching for software applications that are available to be migrated to the at least one private cloud, presenting a list of software applications that are available to be migrated to the at least one private cloud, selecting a software application from the list of software applications that are available to be migrated to the at least one private cloud, the selected software application becoming the migrating software application, resourcing the correct virtual server configuration on the private cloud computing platform to accommodate the migrating software application, migrating the migrating software application to the at least one private cloud, and migrating any software application data of the migrating software application to the at least one private cloud, wherein the private cloud computing platform is transportable, wherein the cloud computing appliance is a self-contained, stand-alone unit.

These are merely some of the innumerable aspects of the present invention and should not be deemed an all-inclusive listing of the innumerable aspects associated with the present invention. These and other aspects will become apparent to those skilled in the art in light of the following disclosure and accompanying drawings. The description and specific examples in this summary are intended for purposes of illustration only and are not intended to limit the scope of the present disclosure.

BRIEF DESCRIPTION OF THE DRAWINGS

The drawings described herein are for illustrative purposes only of selected embodiments and not all possible implementations, and are not intended to limit the scope of the present disclosure. For a better understanding of the present invention, reference may be made to the accompanying drawings in which:

FIG. 6 illustrates a table with representative software components of a cloud computing appliance in accordance with the present invention that is in electronic communication with both a private cloud and a public cloud;

Figure 1:
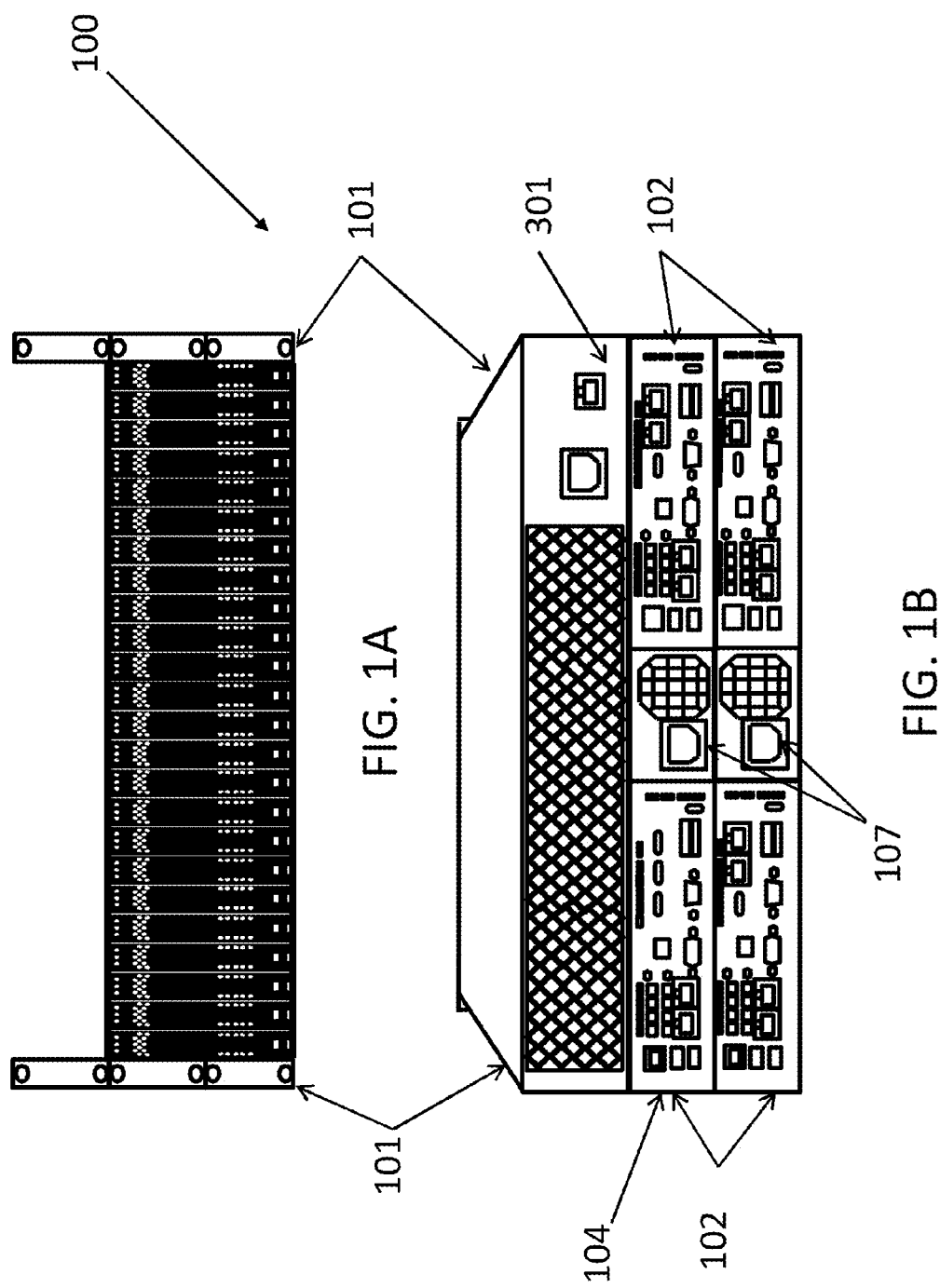
FIGS. 1A and 1B are a front elevation view and rear elevation view, respectively, of a preferred illustrative, but non-limiting, embodiment of a cloud computing appliance that accesses a private cloud and a public cloud in accordance with the present invention.

Reference characters in the written specification indicate corresponding items shown throughout the drawing figures.

DETAILED DESCRIPTION OF THE INVENTION

In the following detailed description, numerous specific details are set forth in order to provide a thorough understanding of the invention. However, it will be understood by those skilled in the art that the present invention may be practiced without these specific details. In other instances, well-known methods, procedures, and components, e.g., devices, have not been described in detail so as to obscure the present invention.

The following list of definitions are provided in order to ensure a consistent understanding of terms used throughout this disclosure: a "system administrator" is a person who interfaces with the transportable cloud computing appliance to instantiate and configure a cloud computing environment as well as manage and maintain the resources of the cloud; a "user" is a person or entity that connects to the transportable private cloud computing platform and utilizes cloud computing resources. Optimally, this transportable cloud computing appliance is in electronic communication with both a private cloud as well as a public cloud. There may also be electronic communication with a community cloud instead of or in addition to the public cloud. The combination of more than one type of cloud is known as "hybrid cloud" types of systems.

An illustrative, but nonlimiting, embodiment of a cloud computing appliance in accordance with the principles of this invention is indicated generally as 100 in FIGS. 1A and 1B. The cloud computing appliance 100 has at least one chassis 101 with sufficient storage capacity to hold the hardware components or devices necessary to run a private cloud instance that is in electronic communication with a public cloud, as described below. In the illustrative, but nonlimiting, embodiment shown in FIGS. 1A and 1B, the at least one chassis 101 is a sixteen (16) RU chassis. The cloud computing appliance 100 has at least one server 102 mounted on the at least one chassis 101 and capable of hosting cloud operating systems for at least one private cloud that is in electronic communication with at least one public cloud, software applications and data storage.

In the illustrative, but nonlimiting, embodiment shown in FIGS. 1A and 1B, a rear view of the cloud computing appliance in accordance with the principles of this invention is indicated generally by numeral 100. The plurality of server nodes 102 can vary in number and preferably, but not necessarily, include four (4) servers. An illustrative, but nonlimiting example of a server 102 includes 1U x86 node servers with dual socket motherboards. Each 1U x86 server has one (1) CPU with a minimum of four (4) cores, a minimum of thirty-two (32) Gigabytes (GB) of memory up to at least five hundred twelve (512) terabytes (TB) of attached storage up to at least six terabytes (TB) of attached storage, and at least four (4) gigabytes (GB) Network Interface Cards (NICs).

Figure 3:
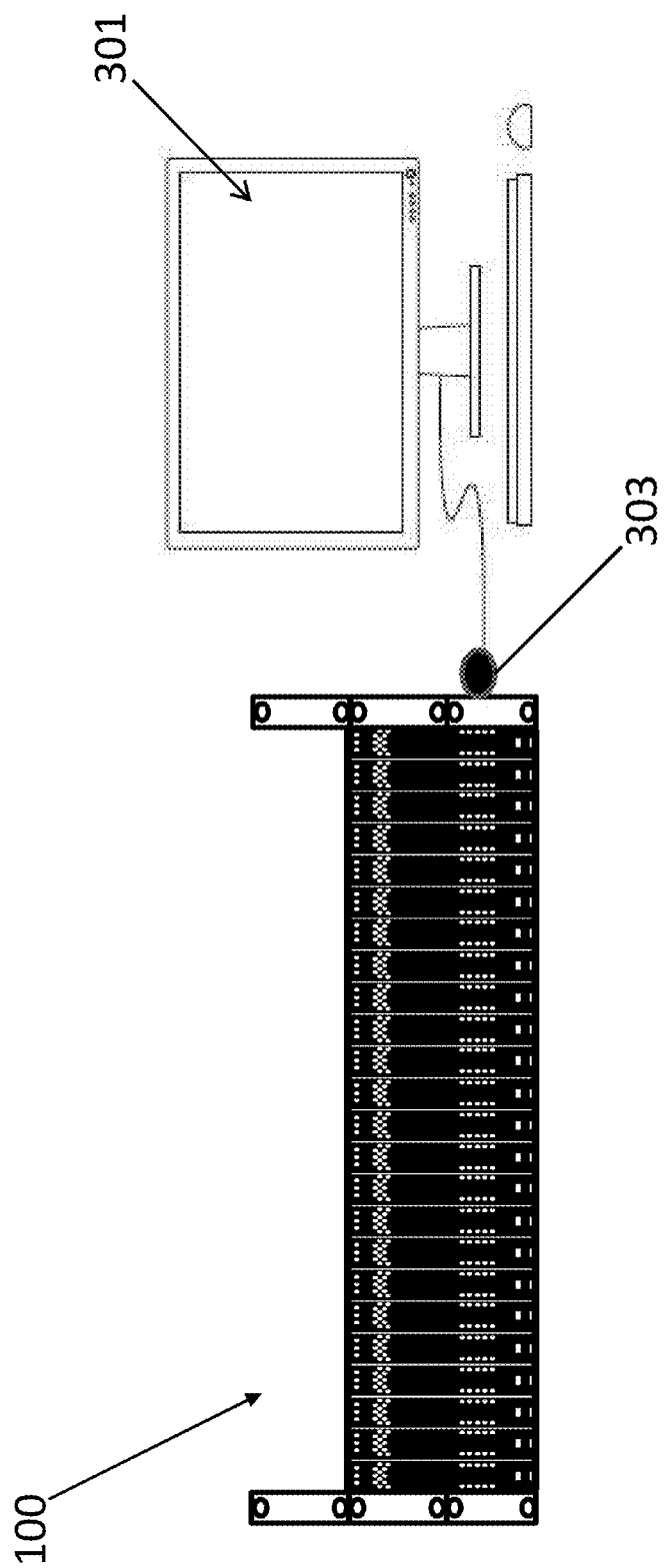
FIG. 3 is a front elevation view of an interface device in addition to the cloud computing appliance shown in FIGS. 1A and 1B in accordance with the present invention.
Figure 5:
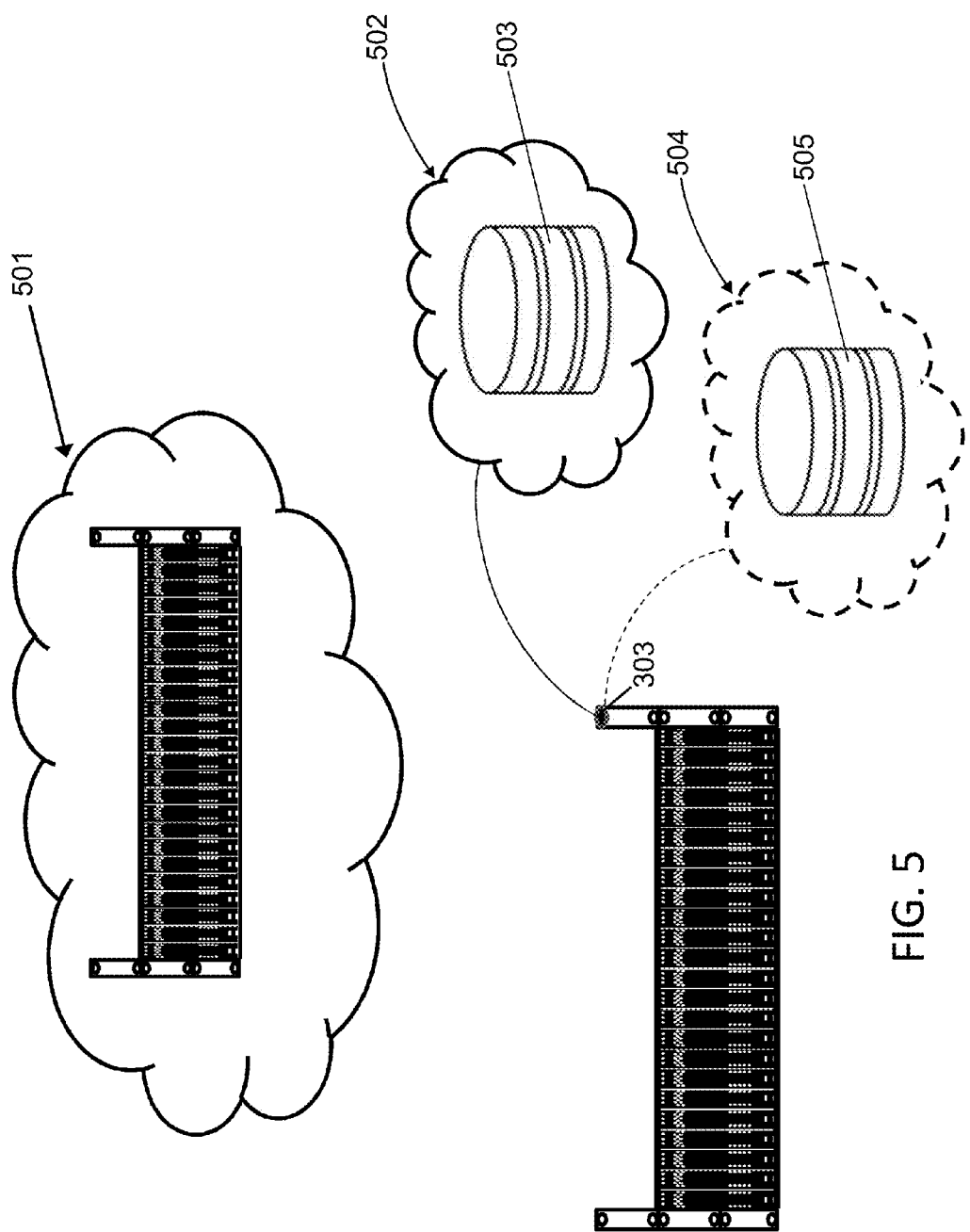
FIG. 5 is a front elevation view of the cloud computing appliance of the present invention that is connected to a public cloud and an optional community cloud.

The cloud computing appliance 100 has an electrical connection, e.g., port, 303, as shown in FIG. 3, where the user can connect an interface device 301 that allows a system administrator to interact with a private cloud 501, as shown in FIG. 5, and the cloud operating system and graphical user interface (GUI) provides guidance to the system administrator to create and administer a fully configured and operational private cloud 501 that is in electronic communication with a public cloud 502, as also shown in FIG. 5. The interface device 301 as shown in FIG. 3 not provided may also be referred to as an "interface component" that facilitates input and output and is preferably, but not necessarily, located away from the cloud computing appliance 100 functioning as a remote interface device 301. A wide variety of devices may suffice for the interface device 301, which includes, but is not limited to, the remote interface device that includes at least one of a keyboard, a video display, a mouse (KVM) switch, and a graphical user interface (GUI).

Figure 2:
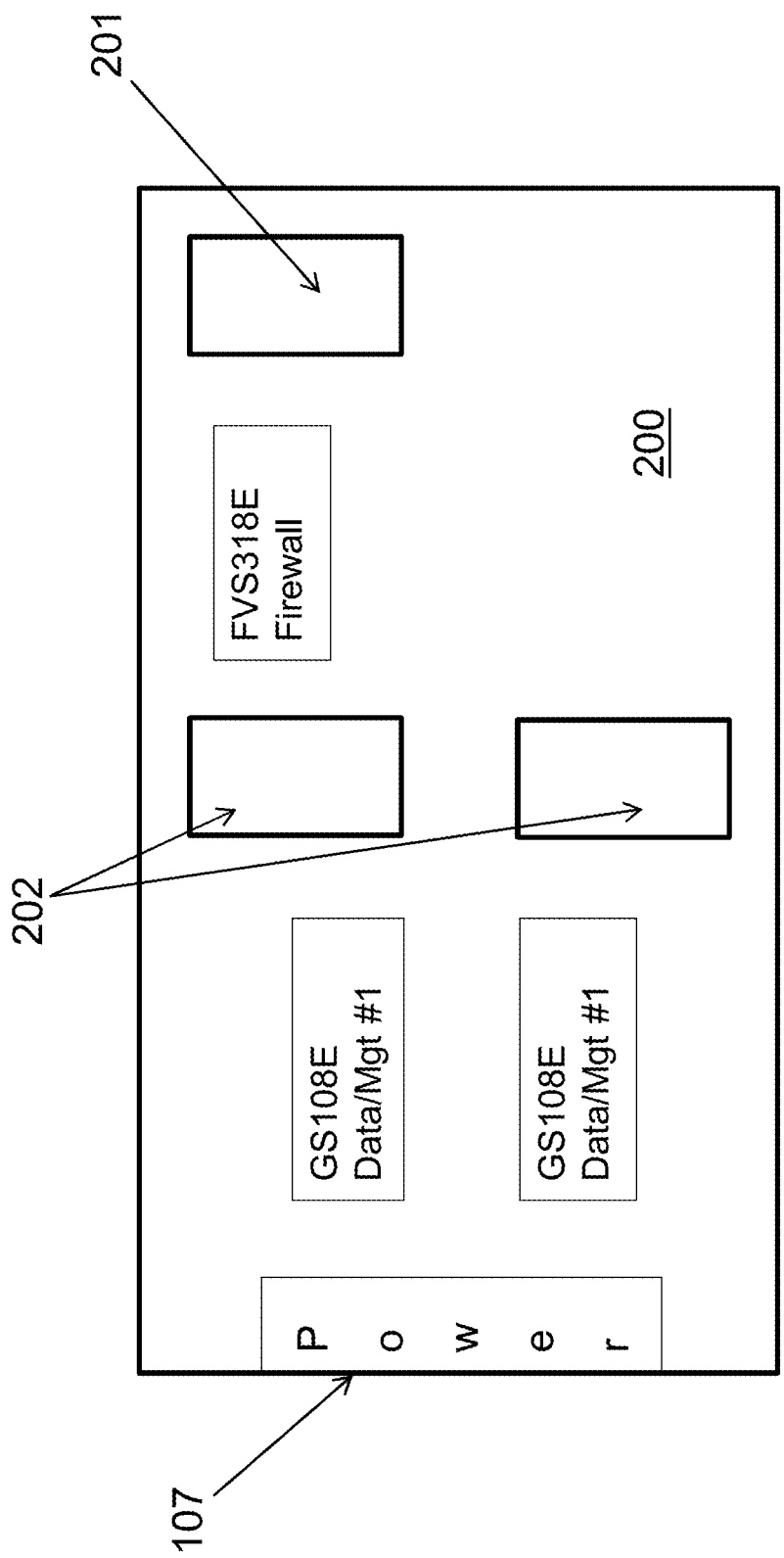
FIG. 2 is a top down view of a preferred illustrative, but non-limiting, embodiment of a of a cloud computing appliance that accesses a private cloud and a public cloud that shows at least two switches and at least one firewall in accordance with the present invention.

The cloud computing appliance 100 has at least two network switches 202 and at least one firewall 201 mounted and housed in the shelf 200 electrically connected to a power supply 107 shown in FIG. 2. In the illustrative, but nonlimiting, embodiment, the at least two network switches 202 may include eight (8) port Gigabit Ethernet Switches 202 with one (1) eight (8) port Firewall 201 utilizing one (1) Gigabit uplinks. The cloud computing appliance 100 includes a power supply circuit 107, shown in FIG. 2, that preferably, but not necessarily, has two (2) power supply circuits capable of distributing power to the components of the cloud computing appliance 100. In the illustrative, but nonlimiting, embodiment shown in FIG. 2, the power supply circuit 107 is a universal power supply (UPS).

An important aspect of the cloud computing appliance 100 is that all of the above referenced components and/or devices necessary to create a private cloud 501 that is in electronic communication with a public cloud 502 are bundled into a singular unit, and that singular unit is transportable. The "transportable" aspect of the private-hybrid cloud appliance 100 is that it be movable as a singular unit. For example, it is not necessary to strip the components and/or devices from the at least one chassis 101 before moving the cloud computing appliance 100.

The cloud computing appliance 100 may optionally provide one or more private clouds 501 as virtual machine instances both located on the chassis 101 and one or more private clouds 501 located remotely away from the cloud computing appliance 100. The cloud computing appliance 100 provides the infrastructure necessary to operate one or more private clouds 501 for a single small organization or restricted group of users. As such, the cloud computing appliance 100 will have access controls in place to restrict access to the private cloud 501, which is in electronic communication with at least one public cloud 502, to a limited number of users.

The cloud computing appliance 100 is a computing platform, meaning that it has the hardware architecture and a software framework necessary to instantiate and run at least one instance of a private cloud 501 that is in electronic communication with a public cloud 502. The specific form of the hardware architecture and software framework of a cloud computing appliance 100 may vary tremendously, with an illustrative, but nonlimiting example provided in detail below.

The interface device 301 may also take on many forms. A graphical user interface (GUI) that can be utilized with the system management server, which is generally indicated by numeral 104 in FIGS. 1A and 1B, may be the same graphical user interface (GUI) that is used for the interface device 301. A system administrator can utilize the interface device 301, as shown in FIG. 3 and is preferably remote, where the interface device can include a keyboard, a video display, a mouse (KVM) switch, and a graphical user interface (GUI).

The power supply circuit 107, shown in FIG. 2, may also take on many forms. In a preferred illustrative, but nonlimiting, embodiment, the power supply circuit 107 is an uninterruptable power supply. In another illustrative, but nonlimiting, embodiment, the power supply circuit is standard 110-volt alternating current (AC) circuit fed through a standard power cord. In another illustrative, but nonlimiting, embodiment, there are several redundant 110-volt alternating current (AC) plugs. There are numerous types of power supplies that may suffice for this type of application.

Figure 4:
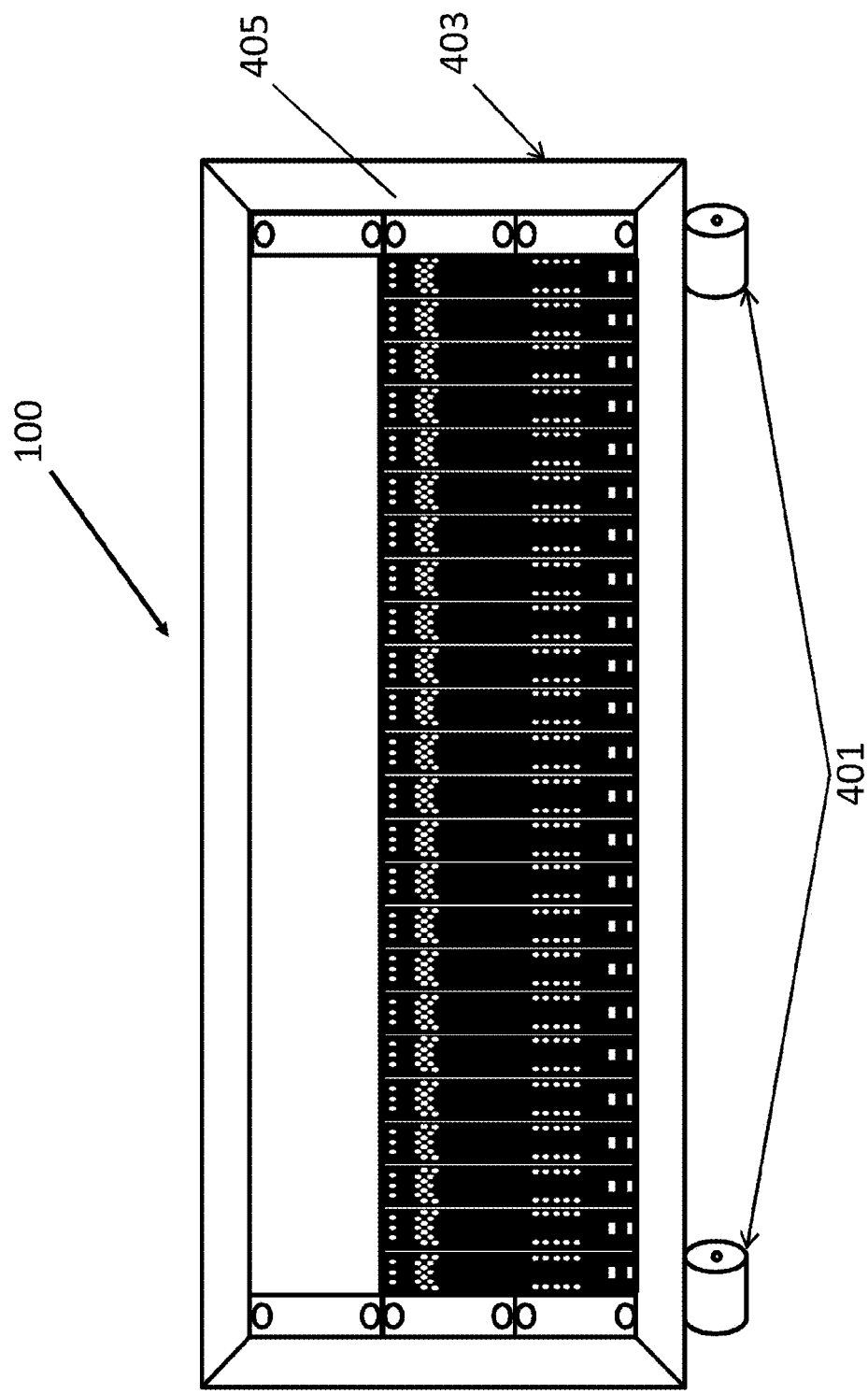
FIG. 4 is a front elevation view of a cloud computing appliance mounted in a removably attached transit case having a plurality of wheels for moving the cloud computing appliance in accordance with the present invention.

In an illustrative, but nonlimiting, embodiment, the cloud computing appliance 100 has a removably attached mobility mechanism to allow for ease of mobility. An illustrative, but nonlimiting, embodiment of the mobility mechanism 403 is shown in FIG. 4. The removably attached mobility mechanism 403, as shown in FIG. 4, preferably, but not necessarily, includes a case 405 with a set of four (4) wheels 401. The removably attached mobility mechanism 403 could be in the form of wheels, rollers, an amphibious hull, or any other mechanism that will allow the cloud computing appliance 100 to be moved without lifting.

In an illustrative, but nonlimiting, embodiment, the cloud computing appliance 100 includes a private cloud 501 that is connected to a public cloud 502 and optionally may also be connected to a community cloud 504 in addition to or in lieu of the public cloud 502, as shown in FIG. 5. The connection is limited so that the cloud computing appliance 100 may exchange data with the public cloud 502 and/or community cloud 504, but is not part of the public cloud 502 or community cloud 504. Preferably, the cloud computing appliance 100 is deployed and is connected to a public cloud 502 in order to query a database 503 in the public cloud 502. The community cloud 504 may also include a database 505.

In order to be operational, the cloud computing appliance 100 must have software installed to enable it to perform the functions of instantiating a private cloud 501 in addition to being in electronic communication with at least one public cloud 502. This includes migrating software applications to the private cloud 501, and managing resources of the private cloud 501.

FIG. 6 is a table of representative software components. Most, if not all, of these software components may be current off-the-shelf software (COTS), however, custom proprietary software can be utilized. The graphical user interface (GUI) 601 is a software component that, among other things, allows the system administrator to interact with the cloud computing appliance 100. The cloud operating system 602 is a software component that, among other things, allows a system administrator to manage the private-hybrid cloud instance. The environment discovery tool 603 is a software component that, among other things, allows a system administrator to discover the servers and software that are part of the network to which the cloud computing appliance 100 is in electronic communication. The migration software 604 is a software component that, among other things, allows a system administrator to identify and migrate physical servers and virtual servers into the cloud computing appliance 100 turning them into virtual instances to establish one or more private clouds 501.

Figure 7:
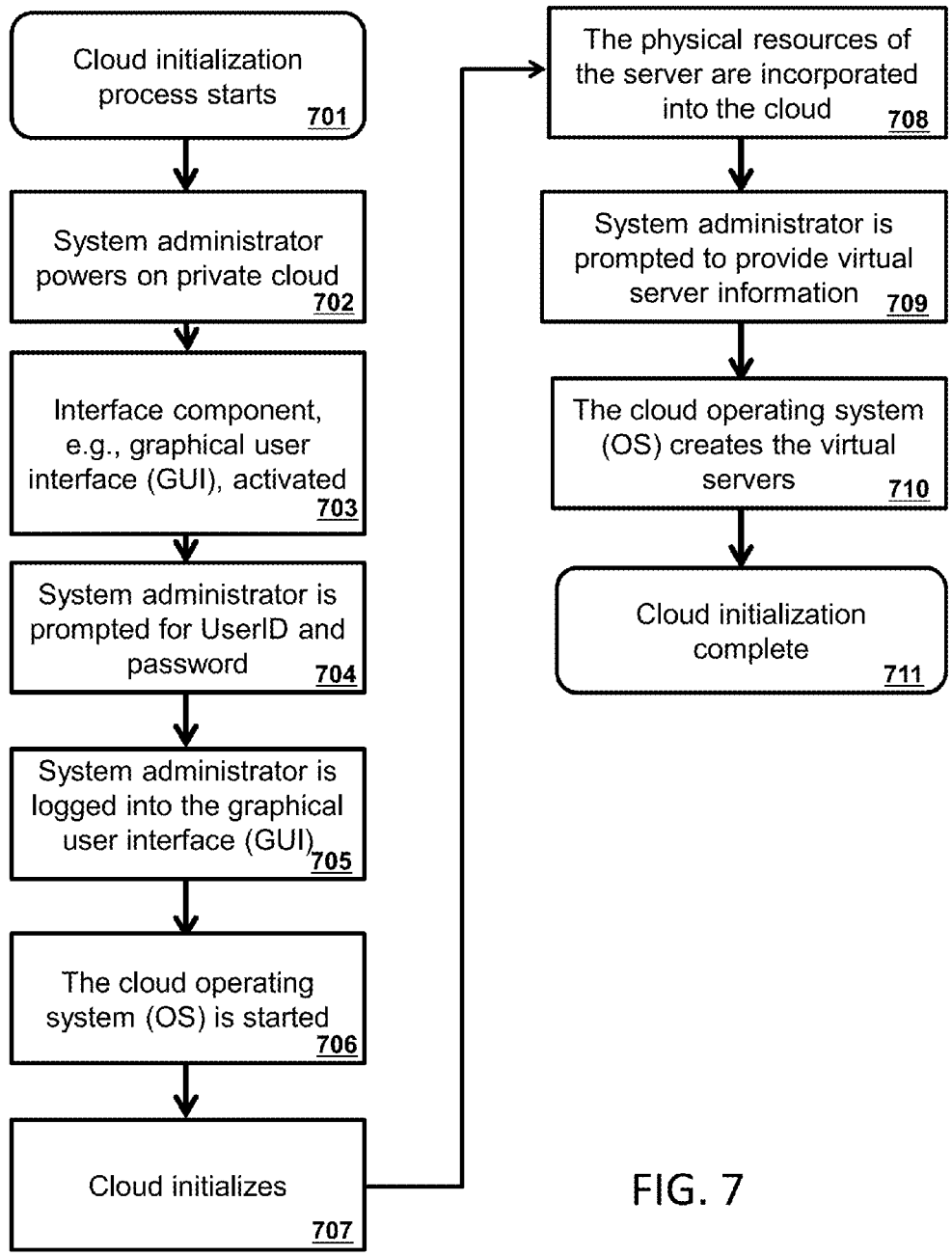
FIG. 7 shows a flow diagram of a cloud computing appliance initialization process in accordance with the present invention that is in electronic communication with both a private cloud and a public cloud.

The methods of initializing the cloud computing appliance 100 and migrating software applications to the cloud computing appliance 100 will now be discussed with reference to the flowcharts in FIG. 7 and FIG. 8, respectively. In the description of the flowcharts, the functional explanation marked with numerals in angle braces, <nnn>, will refer to the flowchart blocks bearing that number.

A feature of the cloud computing appliance 100 is that the interface device 301, which is preferably remote and not attached to the cloud computing appliance 100 but provides electronic communication thereto, provides step-by-step guidance via the graphical user interface (GUI) 601 to enable a novice system administrator with no cloud technical experience to create a fully configured and operational private cloud 501 that is in electronic communication with at least one public cloud 502, administer the private cloud 501 and electronic communication to the public cloud 502, allocate virtual servers, migrate physical and virtual servers with application and data and manage the private cloud 501 that is in electronic communication with at least one public cloud 502. The method of initializing the cloud computing appliance 100 is shown in FIG. 7. The cloud initialization process starts <701> when the system administrator applies power to a power supply circuit 107 of the private cloud 501 <702>, which activates the graphical user interface (GUI) 601 of the interface device 301 <703>. The graphical user interface (GUI) 601 then prompts the system administrator to input required keys <704>, e.g., user identification (ID) and password, resulting in the system administrator being logged into the graphical user interface (GUI) 601 <705>.

The cloud operating system is started or initiated <706> resulting in the initialization of the cloud computing appliance <707>. The graphical user interface (GUI) 601 then prompts the system administrator to enter the internet protocol (IP) range of the plurality of servers 102, and the cloud operating system finds each of the plurality of servers 102 and initializes with the selected cloud computing operating system if it hasn't already been initialized. The physical resources of each server of the plurality of servers 102 is then incorporated into the private cloud 501 <708>. The graphical user interface (GUI) 601 then prompts the system administrator to provide virtual server information <709>, and the cloud operating system creates the virtual servers <710>. Once the virtual servers have been created, the method of initializing the cloud computing appliance 100 is complete <711>.

In an illustrative, but nonlimiting, embodiment of the method of initializing the cloud computing appliance 100, the system administrator is required to authenticate after the graphical user interface (GUI) 601 of the interface device 301 is activated. The system administrator must provide valid credentials before the graphical user interface (GUI) 601 will present the system administrator with a choice of cloud operating systems.

In an illustrative, but nonlimiting, embodiment of the method of initializing the cloud computing appliance 100, the system administrator is presented with a list of internet protocol (IP) addresses, each of the internet protocol (IP) addresses representing one of the plurality of servers 102, to be integrated into the private cloud 501.

In an illustrative, but nonlimiting, embodiment of the method of initializing cloud computing appliance 100, the system administrator is allowed to manually add or remove available cloud appliance resources.

A feature of the cloud computing appliance 100 is that the interface device 301 provides step-by-step automated assistance to a novice system administrator with running software applications in the execution of an automated assessment of a target physical server to determine what configuration a virtual server will need to run the software application, establish a correctly configured virtual server instance, and migrate the physical server application to the virtual server instance. It is envisioned that the method of migrating software applications to the cloud computing appliance 100 may be performed at any time after the cloud computing appliance 100 has been initialized.

Figure 8:
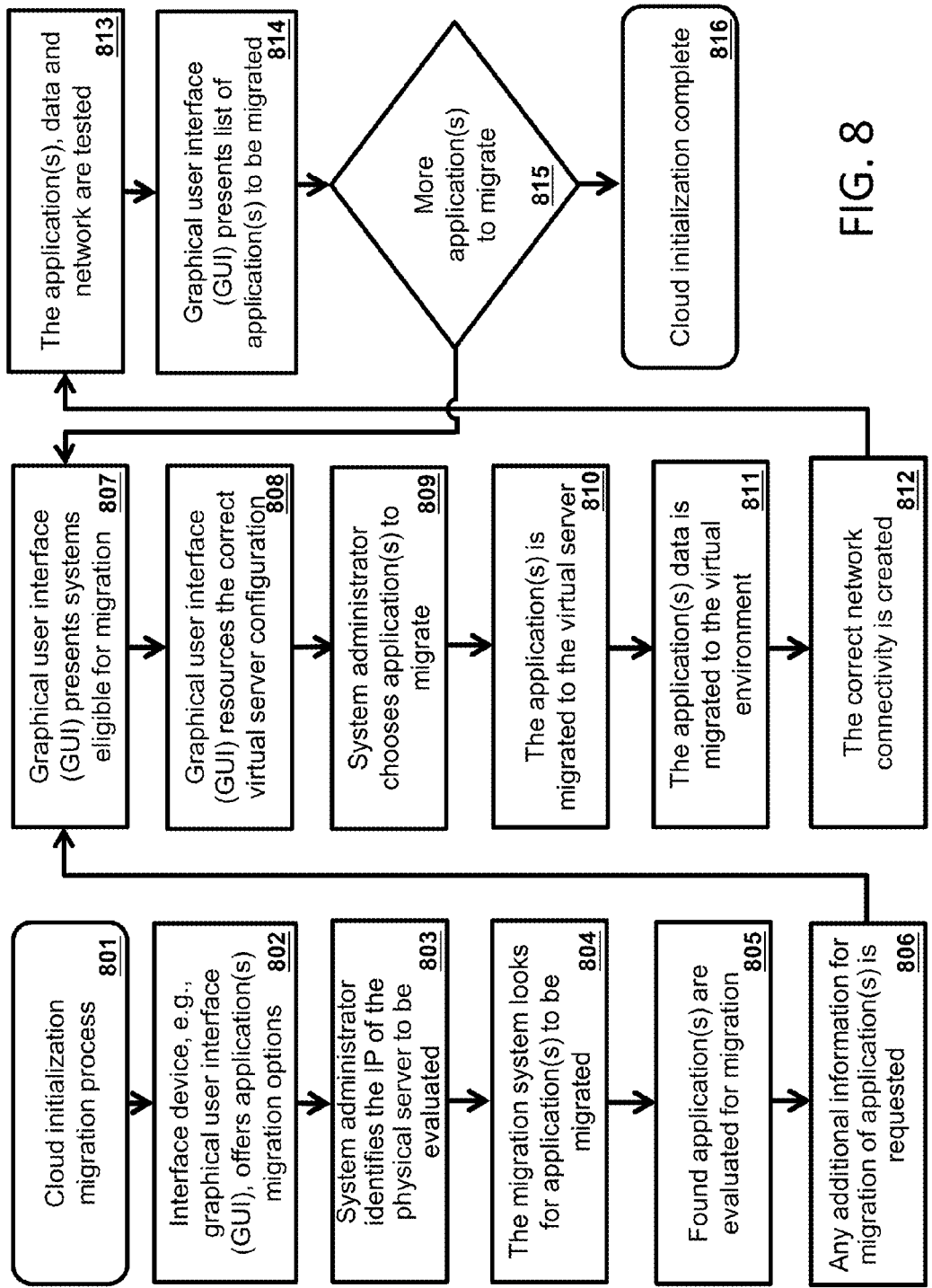
FIG. 8 shows a flow diagram of a cloud computing appliance software application migration process in accordance with the present invention that is in electronic communication with both a private cloud and a public cloud.

The method of migrating software applications to the cloud computing appliance 100 is shown in FIG. 8. The cloud software application migration process starts <801> when a system administrator utilizes the interface device 301 to invoke a software application migration system. The software application migration system is normally built into the graphical user interface (GUI) 601, as part of the interface device 301, but it could be embodied in software, preferably commercial off-the shelf (COTS) software but could be proprietary software. The software application migration system offers software application migration options to the system administrator <802>. The system administrator is guided by the software application migration system to search for software applications that are available to be migrated to the cloud computing appliance 100. In particular, the system administrator may identify the internet protocol (IP) address of a server to be evaluated <803> for software applications to migrate.

However, the software application migration system may automatically search for and select a server 102 for evaluation. Once the server 102 has been identified, the software application migration system searches for software applications that are candidates for migration <804>. The software application migration system evaluates each of these candidates for migration <805>, and additional information may be queried from the system administrator <806> to facilitate the evaluation process. The software application migration system presents a list of systems that are available to be migrated <807>, and the software application migration system resources the correct virtual server configuration on the cloud computing appliance 100 to accommodate the migrating software application <808>. The system administrator then selects a software application from the list to be migrated to the cloud computing appliance 100 <809>. Once a software application is selected by the system administrator <809>, the software application migration system then migrates the migrating software application to a virtual server on the cloud computing appliance 100 <810>. The application data is also migrated to the virtual server on the cloud computing appliance 100 <811>. The correct network connectivity is then created <812>. The application, data and the network are then tested <813>.

The graphical user interface (GUI) 601 then presents a list of software applications to be migrated from the servers 102 <814>. In addition, this process may be repeated if there are more servers 102 to evaluate for software applications to migrate <815> with the process returning to step <807>. Once all desired servers 102 have been evaluated and all desired software applications have been migrated from those servers 102, the method of migrating software applications to the cloud computing appliance 100 that is in electronic communication with at least one public cloud 502 is complete <816>.

Preferably, the test of the application, data, and network connectivity <812> occurs before migration is complete. In another illustrative, but nonlimiting, embodiment, the software application migration system is fully automated and does not require human interaction with the interface device 301 so that migration is an automatic process.

Figure 9:
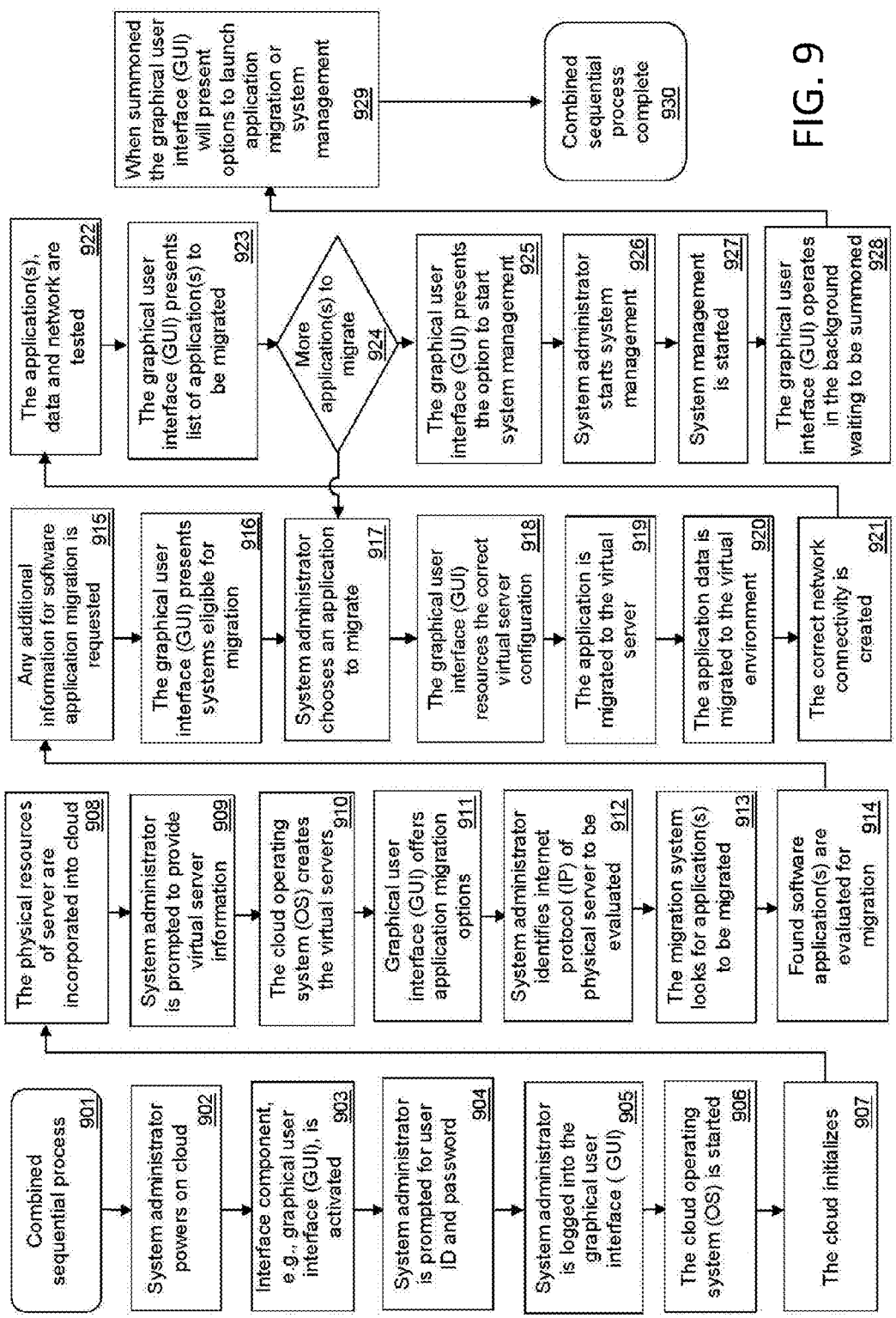
FIG. 9 shows a flow diagram of a cloud computing appliance combined sequential process in accordance with the present invention that is in electronic communication with both a private cloud and a public cloud.

The method of initializing the cloud computing appliance 100 and method of migrating software applications to the cloud computing appliance 100 may be performed in sequence, as shown in FIG. 9. In FIG. 9, the method of initializing the cloud computing appliance 100 is performed first, followed immediately by the method of migrating software applications to the cloud computing appliance 100.

In an illustrative, but nonlimiting, embodiment as shown in FIG. 9, the method of initializing the cloud computing appliance 100 and method of migrating software applications to the cloud computing appliance 100 are performed in sequence with the method of initializing the transportable cloud computing platform 100 is performed first, followed immediately by the method of migrating software applications to the cloud computing appliance 100.

The combined sequential process starts <901> when the system administrator applies power to a power supply circuit 107 of the cloud computing appliance 100 <902>, which activates the graphical user interface (GUI) 601 of the interface device 301 <903>. After the graphical user interface (GUI) 601 of the interface device 301 is activated, the system administrator is prompted for a user identification (ID) and password <904> for authentication. Once the system administrator enters a valid user identification (ID) and password, the system administrator is logged onto the graphical user interface (GUI) 601 <905>.

After the system administrator has logged onto the graphical user interface (GUI) 601, the system administrator can activate and start the operating system <906> to create a private cloud instance. The cloud operating system finds each of the plurality of servers 102 and initializes with the selected cloud computing operating system <907>, if it hasn't already been initialized. The physical resources of each server of the plurality of servers 102 is then incorporated into the private cloud <908>. The graphical user interface (GUI) 601 then prompts the system administrator to provide virtual server information <909>, and the cloud operating system creates the virtual servers <910>. Once the virtual servers have been created, the method of initializing the cloud computing appliance 100 is complete.

The software application migration system offers software application migration options to the system administrator <911>. The system administrator is guided by the software application migration system to search for software applications that are available to be migrated to the cloud computing appliance 100. In particular, the system administrator may identify the internet protocol (IP) address of a server to be evaluated <912> for software applications to migrate.

Once a server 102 has been identified, the software application migration system searches for software applications that are candidates for migration <913>. The software application migration system evaluates each of these candidates for migration <914>, and additional information may be queried from the system administrator <915> to facilitate the evaluation process. The graphical user interface (GUI) 601 presents a list of software applications that are available to be migrated <916>, and the system administrator selects a software application from the list to be migrated to the cloud computing appliance 100 <917>. Once a software application is selected by the system administrator, the software application migration system resources the correct virtual server configuration <918> on the cloud computing appliance 100 to accommodate the migrating software application. The software application migration system then migrates the migrating software application to a virtual server in the cloud computing appliance 100 <919>. Any software application data of the migrating software application is also migrated to the cloud computing appliance 100 <920>. The correct network connectivity is then created <921>. A test is conducted of the migrating software application, any migrating software application data, and the network <922>, before migration is complete.

The graphical user interface (GUI) 601 then presents a list of remaining applications that are candidates for migration <923>. If the system administrator desires to migrate more applications from the list of available candidates <924>, he or she then selects them from the list <917> and the process continues as previously described above in step <917> downward. If the system administrator decides not to migrate more applications or if there are no more available candidate applications for migration <924>, the method of migrating software applications to the transportable private cloud computing platform 100 is complete.

Finally, the graphical user interface (GUI) 601 will present the system administrator with the option of starting a system management application <925>. If the system administrator chooses to start the system management application <926>, the system management application is initiated <927>. The graphical user interface (GUI) 601 is then sent to the background waiting to be summoned <928>. When summoned, the graphical user interface (GUI) 601 will present to the system administrator the options of launching the application migration system or launching the system management application <929>. When the system administrator is finished migrating applications and adjusting physical resources, the combined sequential process is complete <930>.

OPERATIONAL EXAMPLE

In an operation example of the cloud computing appliance 100, purchased by a small business, a small business employee with little training installs the cloud computing appliance 100 in a rack or sets it on a table and initializes the cloud computing appliance 100 by following the guidance of the remote interface device 301. Once the small business employee creates a private cloud 501 instance that is in communication with at least one public cloud 502 on the cloud computing appliance 100, he or she is able to utilize the software application migration system to migrate software applications and data from the existing physical servers of the small business. At this point, the cloud computing appliance 100 is operating as a cloud system, capable of serving all of the cloud needs of the small business.

Furthermore, it should be understood that when introducing elements of the present invention in the claims or in the above description of the illustrative, but nonlimiting, embodiment of the invention, the terms "have," "having," "includes" and "including" and similar terms as used in the foregoing specification are used in the sense of "optional" or "may include" and not as "required." Similarly, the term "portion" should be construed as meaning some or all of the item or element that it qualifies.

Thus, there have been shown and described several embodiments of a novel invention. As is evident from the foregoing description, certain aspects of the present invention are not limited by the particular details of the examples illustrated herein, and it is therefore contemplated that other modifications and applications, or equivalents thereof, will occur to those skilled in the art. Many changes, modifications, variations and other uses and applications of the present construction will, however, become apparent to those skilled in the art after considering the specification and the accompanying drawings. All such changes, modifications, variations and other uses and applications which do not depart from the spirit and scope of the invention are deemed to be covered by the invention which is limited only by the claims that follow.

What is claimed is:

1. A cloud computing appliance, comprising:
a chassis with storage capacity to hold hardware components to operate a private cloud and provide electronic communication to a public cloud;
at least one server mounted on the chassis and capable of hosting a private cloud operating system, a plurality of software applications and data storage, wherein the at least one server includes a system management server that utilizes system management software for managing the cloud computing appliance, the private cloud, the public cloud, and the software applications;
an electrical connection capable of being in electronic communication with a remote interface device that allows a system administrator to interact with the private cloud and the public cloud, wherein the remote interface device provides guidance to the system administrator to create and administer the private cloud and is connected to the at least one server as well as being in electronic communication with the public cloud in order to exchange data with the public cloud, wherein at least one software application of the plurality of software applications on the private cloud was migrated to the private cloud through the remote interface device;
at least two network switches mounted on the chassis and in electronic communication between the at least one server and at least one of the private cloud and the public cloud;
at least one firewall mounted on the chassis and in electronic communication with the at least two network switches; and
at least one power supply circuit capable of distributing power to the at least one server, the at least two network switches and the at least one firewall.

2. The cloud computing appliance in accordance with claim 1, wherein the cloud computing appliance is a self-contained, stand-alone unit.

3. The cloud computing appliance in accordance with claim 1, wherein the cloud computing appliance is in electronic communication with a community cloud.

4. The cloud computing appliance in accordance with claim 1, wherein the private cloud is physically located away from the chassis.

5. The cloud computing appliance in accordance with claim 1, wherein the cloud computing appliance is in electronic communication with a first private cloud attached to the chassis and selectively a second private cloud physically located away from the chassis.

6. The cloud computing appliance in accordance with claim 1, wherein the cloud computing appliance is in electronic communication with at least one public cloud, at least one community cloud and at least one private cloud.

7. The cloud computing appliance in accordance with claim 1, further comprising a removably attached transit case enclosing the chassis.

8. The cloud computing appliance in accordance with claim 7, further comprising a plurality of wheels attached to the bottom of the removably attached transit case for moving the cloud computing appliance.

9. The cloud computing appliance in accordance with claim 1, wherein the remote interface device includes at least one of a keyboard, a video display, a mouse, and a graphical user interface (GUI).

10. The cloud computing appliance in accordance with claim 1, wherein the public cloud includes at least one public cloud storage.

11. The cloud computing appliance in accordance with claim 1, wherein the software applications include a software application for facilitating migration of at least one software application to the private cloud.

12. The cloud computing appliance in accordance with claim 11, wherein the at least one software application can be selectively allowed to migrate to the private cloud through input from the remote interface device.

13. The cloud computing appliance in accordance with claim 11, wherein the at least one software application includes a tool for determining servers and software associated with the network connected cloud computing appliance.

14. A cloud computing appliance, comprising:
at least one chassis with storage capacity to hold hardware components to operate at least one private cloud and provide electronic communication to at least one public cloud;
a plurality of servers mounted on the at least one chassis and capable of hosting a private cloud operating system, a plurality of software applications and data storage, wherein the plurality of servers include a system management server that utilizes system management software for managing the cloud computing appliance, the at least one private cloud and the at least one public cloud, and the software applications;

an electrical connection capable of being in electronic communication with a remote interface device that allows a system administrator to interact with the at least one private cloud and the at least one public cloud, wherein the remote interface device provides guidance to the system administrator to create and administer the at least one private cloud that is connected to the plurality of servers as well as being in electronic communication with the at least one public cloud in order to exchange data with the at least one public cloud, wherein at least one software application of the plurality of software applications on the at least one private cloud was migrated to the at least one private cloud through the remote interface device;

at least one firewall mounted on the chassis and in electronic communication with the private cloud and the public cloud;

at least two network switches mounted on the chassis and in electronic communication between the plurality of servers and the at least one firewall; and at least one power supply circuit capable of distributing power to the plurality of servers, the at least two network switches, and the at least one firewall, wherein the cloud computing appliance is a self-contained, stand-alone unit.

15. The cloud computing appliance in accordance with claim 14, further comprising a removably attached transit case enclosing the chassis and a plurality of wheels attached to the bottom of the removably attached transit case for transporting the cloud computing appliance.

16. The cloud computing appliance in accordance with claim 14, wherein the software applications include a software application for migrating at least one software application to the private cloud.

17. A method of migrating software applications to a cloud computing appliance, the method comprising:

utilizing a remote interface device to allow a system administrator to invoke a software application migration system for the cloud computing appliance that is in electronic communication to at least one public cloud and at least one private cloud hosted on at least one server mounted on a chassis and capable of hosting a private cloud operating system, a plurality of software applications and data storage, wherein the at least one server utilizes system management software for managing the cloud computing appliance, the private cloud, the public cloud, and the software applications, wherein the chassis includes storage capacity to hold hardware components to operate a private cloud and provide electronic communication to a public cloud in order to exchange data with the public cloud;

searching for software applications that are available to be migrated to the at least one private cloud through a remote interface device that allows a system administrator to interact with the private cloud and the public cloud, wherein the remote interface device provides guidance to the system administrator to create and administer the private cloud and is electrically connected to the at least one server as well as being in electronic communication with the public cloud;

presenting a list of software applications that are available to be migrated to the at least one private cloud through the remote interface device;

selecting a software application from the list of software applications that are available to be migrated to the at least one private cloud through the remote interface device, the selected software application becoming the migrating software application;

resourcing the correct virtual server configuration for the at least one private cloud to accommodate the migrating software application through the remote interface device;

migrating the migrating software application to the at least one private cloud; and migrating any software application data of the migrating software application to the at least one private cloud, wherein the at least one server mounted on a chassis that is transportable and a stand-alone unit that includes at least two network switches mounted on the chassis and in electronic communication between the at least one server and at least one of the private cloud and the public cloud, at least one firewall mounted on the chassis and in electronic communication with the at least two network switches and at least one power supply circuit capable of distributing power to the at least one server, the at least two network switches and the at least one firewall.

18. The method of claim 17, wherein the migrating software application, any migrating software application data, and network connectivity are tested before migration is complete.

19. The method of claim 17, wherein the software application migration system is fully automated and does not require human interaction with the remote interface device.

* * * * *